(12) United States Patent
Taggart, IV

(10) Patent No.: US 11,685,604 B2
(45) Date of Patent: Jun. 27, 2023

(54) UNDERGROUND ENERGY STORAGE SYSTEMS

(71) Applicant: William Taggart, IV, Houston, TX (US)

(72) Inventor: William Taggart, IV, Houston, TX (US)

( * ) Notice: Subject to any disclaimer, the term of this patent is extended or adjusted under 35 U.S.C. 154(b) by 0 days.

(21) Appl. No.: 17/518,397

(22) Filed: Nov. 3, 2021

(65) Prior Publication Data

US 2023/0092034 A1 Mar. 23, 2023

Related U.S. Application Data

(60) Provisional application No. 63/274,433, filed on Nov. 1, 2021, provisional application No. 63/259,893, filed on Sep. 17, 2021.

(51) Int. Cl.
*B65G 5/00* (2006.01)
(52) U.S. Cl.
CPC ...................................... *B65G 5/00* (2013.01)
(58) Field of Classification Search
CPC ... B65G 5/00; Y02E 60/32; F17C 2270/0152; E21C 41/20; E21D 13/00
See application file for complete search history.

(56) References Cited

U.S. PATENT DOCUMENTS

| | | | |
|---|---|---|---|
| 1,247,520 A | 11/1917 | Reginald | |
| 1,813,107 A | 7/1931 | Allner | |
| 2,947,146 A | 8/1960 | Loofbourow | |
| 3,068,654 A | 12/1962 | Warren | |
| 3,385,067 A | 5/1968 | Eek | |
| 3,438,203 A * | 4/1969 | Lamb | E21B 43/38 405/59 |
| 3,939,356 A | 2/1976 | Loane | |
| 4,117,684 A * | 10/1978 | Hendrix | B65G 5/00 137/386 |
| 4,182,128 A | 1/1980 | Gardner | |

(Continued)

FOREIGN PATENT DOCUMENTS

| WO | 2012037175 A1 | 3/2012 |
|---|---|---|
| WO | 2012119054 A2 | 9/2012 |

(Continued)

*Primary Examiner* — Carib A Oquendo
(74) *Attorney, Agent, or Firm* — Crowe & Dunlevy, P.C.

(57) ABSTRACT

Systems for underground energy storage and methods for their construction. Methods include forming a plurality of chambers underground connected to a plurality of multiple flow conduits, the plurality of chambers including an upper chamber and a lower chamber each containing a working fluid, each multiple flow conduit of the plurality of multiple flow conduits comprising an inner tubular segment having a flowbore interior to the inner tubular segment configured to flow the working fluid, and an outer tubular segment containing the inner tubular segment, wherein each multiple flow conduit defines an annulus between the outer tubular segment and the inner tubular segment configured to flow a compressed gas, by drilling a borehole in the earth formation, installing an outer tubular segment in the borehole, cementing the outer tubular segment at a target location, and installing the inner tubular segment inside the outer tubular segment.

16 Claims, 9 Drawing Sheets

(56) References Cited

U.S. PATENT DOCUMENTS

| | | | | |
|---|---|---|---|---|
| 4,626,131 A | * | 12/1986 | Glew | B65G 5/00 |
| | | | | 137/154 |
| 4,691,524 A | | 9/1987 | Holscher | |
| 4,808,029 A | | 2/1989 | Grupping | |
| 5,669,734 A | * | 9/1997 | Becnel, Jr. | E21B 43/281 |
| | | | | 299/5 |
| 7,097,386 B2 | * | 8/2006 | Maduell | E21B 43/28 |
| | | | | 588/250 |
| 7,281,371 B1 | | 10/2007 | Heidenreich | |
| 9,683,540 B2 | | 6/2017 | Winkler et al. | |
| 10,049,776 B2 | | 8/2018 | Wattenburg et al. | |
| 10,707,802 B1 | | 7/2020 | Materna et al. | |
| 2005/0061396 A1 | * | 3/2005 | Landry | F17C 7/04 |
| | | | | 62/50.2 |
| 2006/0150640 A1 | * | 7/2006 | Bishop | F17C 9/02 |
| | | | | 62/53.1 |
| 2011/0305515 A1 | * | 12/2011 | Drnevich | B65G 5/00 |
| | | | | 405/53 |
| 2016/0089705 A1 | * | 3/2016 | Oates | C01B 3/02 |
| | | | | 405/57 |

FOREIGN PATENT DOCUMENTS

| | | | |
|---|---|---|---|
| WO | 2019080219 A1 | 5/2019 | |
| WO | 2022143428 A1 | 7/2022 | |

\* cited by examiner

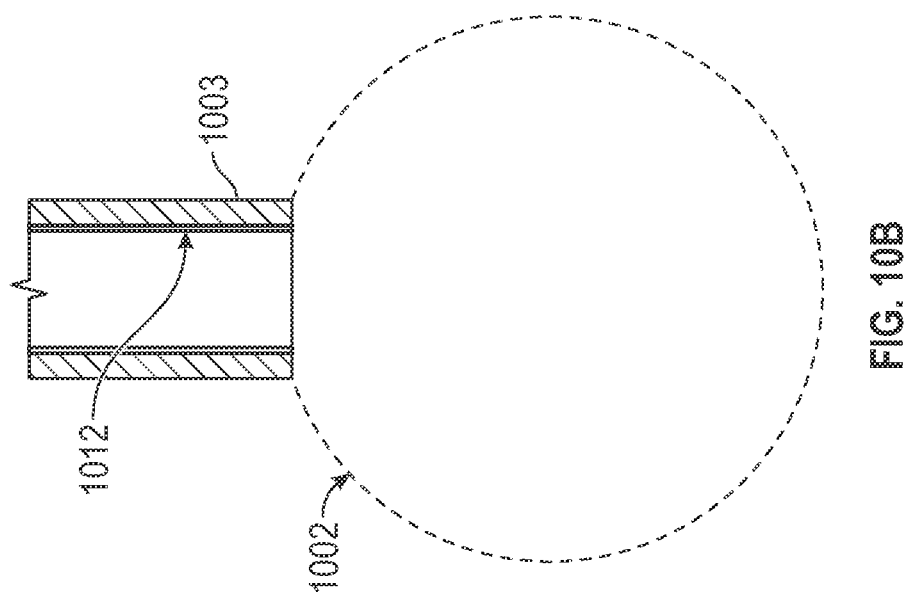
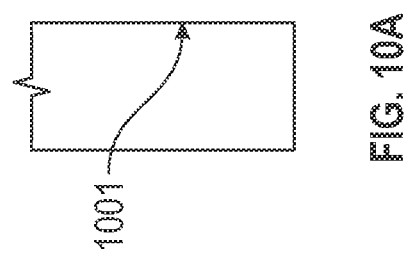

UNDERGROUND ENERGY STORAGE SYSTEMS

CROSS-REFERENCE TO RELATED APPLICATION

This application claims the benefit of Provisional Patent Application No. 63/259,893 filed Sep. 17, 2021, and Provisional Patent Application No. 63/274,433 filed on Nov. 1, 2021, both of which are incorporated by reference herein in their entirety.

FIELD OF THE DISCLOSURE

In one aspect, this disclosure relates generally to subterranean energy storage systems.

BACKGROUND OF THE DISCLOSURE

Systems for storing and recovering energy are well known. One prominent type of energy storage system works in connection with a hydroelectric assembly by moving a fluid (usually water) between two reservoirs at different elevations. During times when surplus electricity is available on the grid, fluid is moved from the lower reservoir to the upper reservoir using the surplus electricity. For example, the water may be moved using a pump. By doing so, the electrical energy is converted to potential energy in the form of the elevated fluid. When additional electricity is needed for the grid, fluid is allowed to move from the upper reservoir to the lower reservoir to recover the stored energy by the turning of a turbine or the like.

Another type of system stores energy as elastic potential energy in the form of compressed air in an underground reservoir, known as compressed air energy storage ('CAES'). The potential energy is later recovered by allowing the gas to expand. This type of energy storage system requires that the reservoirs be configured to withstand pressures of 250 atmospheres or more ('high pressure') without significant fluid leakage.

SUMMARY OF THE DISCLOSURE

In aspects, the present disclosure is related to methods for constructing underground energy storage systems in an earth formation having a salt deposit. Methods may include forming a plurality of chambers underground connected to a plurality of multiple flow conduits, the plurality of chambers including an upper chamber and a lower chamber each containing a working fluid, each multiple flow conduit of the plurality of multiple flow conduits comprising an inner tubular segment having a flowbore interior to the inner tubular segment configured to flow the working fluid, and an outer tubular segment containing the inner tubular segment, wherein each multiple flow conduit defines an annulus between the outer tubular segment and the inner tubular segment configured to flow a compressed gas, and connecting selected ones of the plurality of multiple flow conduits. The forming of the plurality of chambers underground may be carried out by forming each respective chamber by drilling a borehole in the earth formation; installing an outer tubular segment in the borehole; terminating and cementing the outer tubular segment at a distal end of the outer tubular segment at a target location within the salt deposit above an upper end of a desired location of the respective chamber of the plurality of chambers; continuing drilling within the salt deposit to extend the borehole; installing the inner tubular segment with a distal end of the inner tubular segment within the salt deposit at a target depth of a floor of the respective chamber and with a portion of the inner tubular segment interior to the outer tubular segment; injecting an aqueous solution into the salt deposit through the outer tubular segment to form a brine; and removing at least a portion of the brine through the inner tubular segment. In other aspects the subterranean formation may not include a salt deposit.

Methods may also include establishing fluid communication between an upper portion of the upper chamber and an upper portion of the lower chamber. Establishing fluid communication between the upper portion of the upper chamber and the upper portion of the lower chamber may comprise injecting aqueous solution into the salt deposit to form a passage connecting the upper chamber and the lower chamber.

The plurality of multiple flow conduits may be configured to constrain pressure loss from any chamber of the plurality of chambers for any cycle of storage and recovery to less than five percent of the nominal operating head for the system. Methods may further comprise configuring the aggregate flow capacity to substantially eliminate pressure loss from any chamber of the plurality of chambers due to flow of a working fluid therein. Configuring the aggregate flow capacity to substantially eliminate pressure loss from any chamber of the plurality of chambers due to flow of a working fluid therein may comprise selecting at least one of: i) the number of the plurality of inner tubular segments; and ii) dimensions of at least a portion of the plurality of inner tubular segments.

The working fluid may comprise a brine. Drilling the borehole may comprise using a drill bit at a distal end of a drill string to disintegrate a portion of the earth formation at the drill bit.

Methods may further include establishing a differential pressure between the upper chamber and the lower chamber by injection of a compressed gas to the upper portion of the upper chamber and the upper portion of the lower chamber via at least one outer tubular segment of the plurality.

Establishing the differential pressure between the upper chamber and the lower chamber may include injecting compressed gas to the annulus for the upper chamber and the annulus for the lower chamber while maintaining fluid communication between the upper chamber and lower chamber; commence removal of a portion of the working fluid from both the upper chamber and the lower chamber for the plurality of multiple flow conduits; upon the compressed gas pressure in the annulus reaching a first target pressure, the first target pressure corresponds to a first volume of working fluid in the upper chamber reaching a first operational volume, ceasing flow via at least one respective inner tubular segment for the upper chamber to cease removal of working fluid from the upper chamber; while maintaining injection of compressed gas, continuing removal of the portion of the working fluid from the lower chamber via respective ones of the plurality of inner tubular segments; upon the compressed gas pressure in the annulus reaching a second target pressure, the second target pressure corresponds to a second volume of working fluid in the lower chamber reaching a second operational volume, ceasing flow via at least one respective inner tubular segment for the lower chamber to cease removal of working fluid from the lower chamber, while maintaining injection of compressed gas; upon the compressed gas pressure in the annulus reaching a third target pressure, the third target pressure being the compressed gas pressure within the plurality of chambers that equates to the target surface pressures necessary to establish the nominal operating head, ceasing injection of compressed gas. Commencing removal of a portion of the working fluid from both the upper chamber and the lower chamber may be carried out via the flowbore of the respective inner tubular segment for the plurality of multiple flow conduits. Alternatively, the removal of a portion of the working fluid may be carried out via an annulus formed by a tubular inside the outer tubular.

Other methods of the present disclosure include drilling a borehole in the earth formation; installing an outer tubular segment in the borehole; terminating and cementing the outer tubular segment at a distal end of the outer tubular segment at a target location within the salt deposit; continuing drilling within the salt deposit to extend the borehole; installing a middle tubular segment to form an outer annulus; installing an inner tubular segment with a distal end of the inner tubular segment within the salt deposit at a target depth of a floor of the respective chamber to form a middle annulus. Methods may also include injecting compressed gas through the outer annulus to establish a gas cap in the well bore above where the solution mining is to occur. Methods may also include injecting an aqueous solution into the salt deposit through the inner tubular segment to form a brine. Methods may also include removing at least a portion of the brine through the middle tubular segment. Methods may also include establishing a differential pressure between the upper chamber and the lower chamber by injection of a compressed gas to the upper portion of the upper chamber and the upper portion of the lower chamber via at least one outer tubular segment of the plurality. Methods may also include injecting compressed gas to the outer annulus piping for the upper chamber and lower chamber while maintaining fluid communication between the upper chamber and lower chamber and commencing removal of a portion of the working fluid from both the upper chamber and the lower chamber via the plurality of inner tubular segments.

Other methods may include connecting a plurality of caverns underground to a plurality of multiple flow conduits, the plurality of caverns including an upper cavern and a lower cavern each containing a working fluid, each multiple flow conduit of the plurality of multiple flow conduits comprising: an inner tubular segment having a flowbore interior to the inner tubular segment configured to flow the working fluid, and an outer tubular segment containing the inner tubular segment, wherein each multiple flow conduit defines an annulus between the outer tubular segment and the inner tubular segment configured to flow a compressed gas, and connecting selected ones of the plurality of multiple flow conduits. The connecting the plurality of caverns underground may comprise connecting each respective cavern by: drilling a borehole in the earth formation; installing an outer tubular segment in the borehole; terminating and cementing the outer tubular segment at a distal end of the outer tubular segment at a target location within the salt deposit above an upper end of the cavern; continuing drilling into the cavern; installing the inner tubular segment with a distal end of the inner tubular segment within the salt deposit at a target depth for a floor of the respective cavern and with a portion of the inner tubular segment interior to the outer tubular segment; injecting an aqueous solution into the salt deposit through the inner tubular segment to form a brine; removing at least a portion of the brine.

Methods may further include establishing fluid communication between an upper portion of the upper chamber and an upper portion of the lower chamber. Establishing fluid communication between the upper portion of the upper chamber and the upper portion of the lower chamber may comprise injecting aqueous solution into the salt deposit to form a passage connecting the upper chamber and the lower chamber.

The plurality of multiple flow conduits may be configured to constrain pressure loss from any chamber of the plurality of chambers for any cycle of storage and recovery to less than five percent of the nominal operating head for the system. Methods may further include configuring the aggregate flow capacity to substantially eliminate pressure loss from any chamber of the plurality of chambers due to flow of a working fluid therein. Configuring the aggregate flow capacity to substantially eliminate pressure loss from any chamber of the plurality of chambers due to flow of a working fluid therein may comprise selecting at least one of: i) the number of the plurality of inner tubular segments; and ii) dimensions of at least a portion of the plurality of inner tubular segments.

Methods may further include establishing a differential pressure between the upper chamber and the lower chamber by injection of a compressed gas to the upper portion of the upper chamber and the upper portion of the lower chamber via at least one outer tubular segment of the plurality. Establishing the differential pressure between the upper chamber and the lower chamber may be carried out by injecting compressed gas to the annulus for the upper chamber and the annulus for the lower chamber while maintaining fluid communication between the upper chamber and lower chamber; commence removal of a portion of the working fluid from both the upper chamber and the lower chamber via the flowbore of the respective inner tubular segment for the plurality of multiple flow conduits; upon the compressed gas pressure in the annulus reaching a first target pressure, the first target pressure corresponds to a first volume of working fluid in the upper chamber reaching a first operational volume, ceasing flow via at least one respective inner tubular segment for the upper chamber to cease removal of working fluid from the upper chamber; while maintaining injection of compressed gas, continuing removal of the portion of the working fluid from the lower chamber via respective ones of the plurality of inner tubular segments; upon the compressed gas pressure in the annulus reaching a second target pressure, the second target pressure corresponds to a second volume of working fluid in the lower chamber reaching a second operational volume, ceasing flow via at least one respective inner tubular segment for the lower chamber to cease removal of working fluid from the lower chamber, while maintaining injection of compressed gas; upon the compressed gas pressure in the annulus reaching a third target pressure, the third target pressure being the compressed gas pressure within the plurality of chambers that equates to the target surface pressures necessary to establish the nominal operating head, ceasing injection of compressed gas.

Other aspects of the disclosure may include an underground energy storage system in an earth formation having a salt deposit. Systems may include a plurality of chambers underground connected to a plurality of multiple flow conduits, the plurality of chambers including an upper chamber and a lower chamber each containing a working fluid, each multiple flow conduit of the plurality of multiple flow conduits comprising an inner tubular segment having a flowbore interior to the inner tubular segment configured to flow the working fluid, and an outer tubular segment containing the inner tubular segment, wherein each multiple flow conduit defines an annulus between the outer tubular segment and the inner tubular segment configured to flow a compressed gas, wherein the outer tubular segment is cemented at a distal end of the outer tubular segment at a target location within the salt deposit above an upper end of the respective chamber of the plurality of chambers; and the inner tubular segment is installed with a distal end of the inner tubular segment at a floor of the respective chamber and with a portion of the inner tubular segment interior to the outer tubular segment.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 10A-10E show schematic diagrams illustrating construction of a system utilizing methods described herein in accordance with embodiments of the present disclosure.

DETAILED DESCRIPTION

Figure 1:
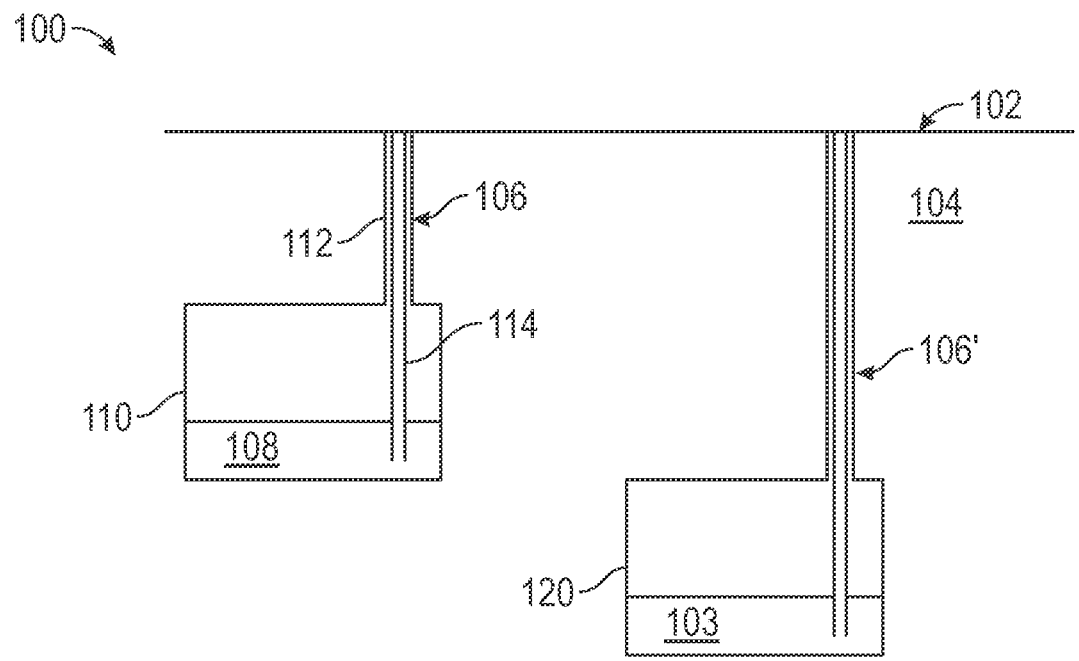
FIG. 1 shows a schematic diagram of an example energy storage system in accordance with embodiments of the present disclosure.

Aspects of the present disclosure relate to methods for constructing underground energy storage systems in an earth formation having a salt deposit by forming or utilizing a plurality of chambers in the salt deposit underground. The chambers may be physically adjacent to one another and may be either existing salt dome caverns or specifically made chambers for energy storage.

Aspects of the present disclosure relate to energy storage systems, and methods for their construction and operation. Aspects of the disclosure may be particularly beneficial in locations where terrain is essentially flat, thereby not supporting traditional pumped storage hydroelectric. For example, aspects may be used to store energy from a wind turbine farm.

In operation, systems in accordance with the present disclosure move (e.g., pump) a working fluid from a chamber having a lower elevation (a 'lower chamber') to a chamber having a higher elevation (an 'upper chamber') to store potential energy. When desired, electricity may be recovered from the system by allowing the fluid to return from the upper chamber to the lower chamber and harnessing the energy released by the change in elevation. For example, a turbine or other hydroelectric device may be configured to convert the energy of the moving fluid into electricity. The working fluid may be flowed through fluid tubulars (e.g., pipes) in fluid communication with the chambers in order to move fluid between chambers of different elevations. Together with the fluid tubulars, systems in accordance with the present disclosure may include manifolds, valves, associated control systems, and so on to effect these operations. The working fluid may be a non-compressible fluid that is non-reactive with the walls of the chambers.

Additional tubulars, shafts, manifolds, valves, associated control systems, and so on may form a gas flow system. Pressurized gas may be introduced to chambers via the gas flow system to create and maintain a gas pressure substantially equal to the hydrostatic pressure between the chambers. The difference in surface pressure between the working fluid in the fluid tubulars at lower chambers and those at upper chambers is referred to herein as the nominal operating head of the energy storage system. By maintaining an operating head, a commercial pump may easily provide liquid pressure sufficient to drive the working fluid upward to cause flow of the working fluid to the upper chamber(s). Thus, the liquid pressure necessary to drive the fluid corresponds to the operating head, and therefore the gas pressure. In accordance with aspects of the present disclosure, the conduits may be configured for sufficient aggregate flow capacity for flow of the working fluid therethrough to reduce pressure loss during the flow of the working fluid to negligible levels, such as, for example, less than five percent of the operating head.

In aspects of the disclosure, multiple large-diameter conduits are used to move the fluid volumes required. These same conduits may be utilized to create the chamber within the salt dome. The conduits may be multiple flow conduits formed as wells having inner tubulars and outer tubulars. In operation, the inner tubulars may be tied to a fluid flow system and the outer tubulars may be tied to a gas flow system. The outer tubular segments may be cemented in place.

The inner tubulars may be comprised of inner tubular segments with a flowbore interior to the inner tubular segments that is configured to flow the working fluid. The outer tubulars may be comprised of outer tubular segments containing (surrounding) the inner tubular segments. Each multiple flow conduit may define an annulus between the outer tubular segment and the inner tubular segment. This annulus may be configured to flow a compressed gas. The outer tubular segments may be terminated and cemented directly above the salt dome chamber (or the anticipated location thereof), whereas the inner tubular segments may continue to the bottom of the chamber.

During operation, the annulus is utilized for connection of the portions of the chambers containing the compressed gas, and the flowbore is used to move the working fluid between chambers. The fluid tubulars for each chamber may connect at the surface in large diameter pipes, wherein the fluid may be engaged by at least one turbine or pump. Surface as used herein is meant to include points above the surface. In some implementations, one or more Francis turbines may be employed as both pump and turbine. In some implementations, the tubulars connect at the surface of an ocean bed, such as offshore platforms floating or otherwise stationed above a body of water. The dimensions and the number of tubulars may be configured to constrain pressure loss from any chamber of the plurality of chambers for any cycle of storage and recovery to less than five percent of the nominal operating head for the system. Methods of the present disclosure include configuring the aggregate flow capacity to substantially eliminate pressure loss from any chamber of the plurality of chambers due to flow of a working fluid therein. This may be carried out by determining the target aggregate flowrate in the inner tubing for the corresponding target pressure. Ideally, the flowbore capacity is sufficiently large to avoid a pressure differential when flowing from one chamber to another. As the water flows, the friction within the pipe reduces the velocity of the water coming out the bottom. Increases in water flow increase friction. Larger pipes create less friction, delivering more power to the turbine. Such a pressure differential will dissipate energy, thereby reducing the overall efficiency of the unit as it cycles through energy storage and release. The dimensions of the system may be calculated from the desired available power in accordance with the formula $$P_{th} = \rho \, q \, g \, h$$

wherein $P_{th}$ is equal to theoretically available power (W), $\rho$ is the density (kg/m$^3$) (~1000 kg/m$^3$ for water), q is the water flow (m$^3$/s), g is the acceleration of gravity (9.81 m/s$^2$), and h is the falling height, head (m). Water flow may be calculated as Q=Av, where A is the cross-sectional area and v is the average velocity. Head loss in a pipeline with Newtonian fluids can be determined in accordance with the Darcy equation as equal to $$h_L = f(L/D)(v^2/2\,g) \text{ or } h_L = 0.0311 \, fL \, Q^2/d^3$$

where $h_L$ is head loss (feet of fluid), f is the Darcy friction factor, L is the pipe length (feet), D is the inside pipe diameter (feet), v is the fluid velocity (feet/sec), g is the gravitational constant (32.2 feet/sec$^2$), d is the inside pipe diameter (in inches) and Q is volumetric flow rate (gallons/minute).

The required overall flowrate for the energy storage system may be divided by the flowrate of the flowbore for a particular segment of inner tubing (and rounding, if necessary). As defined herein, the phrase "substantially eliminating pressure loss" refers to constraining pressure loss from any chamber of the plurality of chambers for any cycle of storage and recovery to a percentage of the nominal operating head for the system of less than three percent, including less than two percent, less than one percent, and so on, including down to and including zero measurable pressure loss from any chamber of the plurality of chambers for any cycle of storage and recovery.

Configuring the aggregate flow capacity to substantially eliminate pressure loss may include selecting at least one of: i) the number of the plurality of inner tubular segments; and ii) dimensions of at least a portion of the plurality of inner tubular segments. Thus, the dimensions and number of tubulars may be configured to ensure that the pressure loss from any chamber to the turbine/pump(s) does not exceed two percent of the overall target head for the system.

The multiple flow conduits of the present disclosure reduce costs in forming the chambers. These conduits also reduce the number of boreholes required to be drilled, further reducing costs as well as system complexity. Advantageously, in the techniques of the present disclosure, personal may remain above-ground. Further, aspects of the present disclosure enable the construction and operation of underground energy storage systems while reducing or eliminating the need for lateral cavities to be formed. Thus, the system is free of downhole transverse connections.

FIG. 1 shows a schematic diagram of an example energy storage system in accordance with embodiments of the present disclosure. The system 100 includes an upper chamber 110, a lower chamber 120, and a plurality of multiple flow conduits (106, 106'). The upper chamber 110 and the lower chamber 120 are located in a subterranean earth formation 104 below the surface of the earth 102. At least one multiple flow conduit (106, 106') is connected to each chamber. Each of the upper chamber and the lower chamber contain a working fluid 103 & 108, such as, for example, a brine. Each multiple flow conduit 106, 106' comprises an inner tubular segment 114 and an outer tubular segment 112 containing (e.g., encircling) the inner tubular segment 114.

Figure 2:
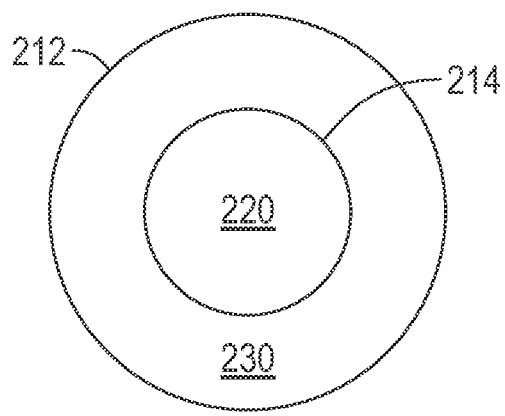
FIG. 2 shows a cross-sectional view of an example multiple flow conduit in accordance with embodiments of the present disclosure.

FIG. 2 shows a cross-sectional view of an example multiple flow conduit in accordance with embodiments of the present disclosure. The inner tubular segment 214 has a flowbore 220 interior to the segment. The flowbore 220 is configured to flow the working fluid. The multiple flow conduit defines an annulus 230 between the outer tubular segment 212 and the inner tubular segment 214 configured to flow a compressed gas. The longitudinal axis of the inner tubular segment 214 may be substantially coaxial with the longitudinal axis of the outer tubular segment 212, wherein the respective longitudinal axis of each segment lies interior to the inner tubular segment. Thus, the cross sections at a particular junction may be concentric circles. Alternatively, the cross sections may be eccentric with respect to one another. The cross section of the inner tubular segment 214 may be circumscribed by the cross section of the outer tubular segment 212.

In aspects of the present disclosure, fluid access may be provided via multiple wells drilled from the surface. These wells may be joined together on the surface via manifold and form a fluid flow system.

Figure 3A:
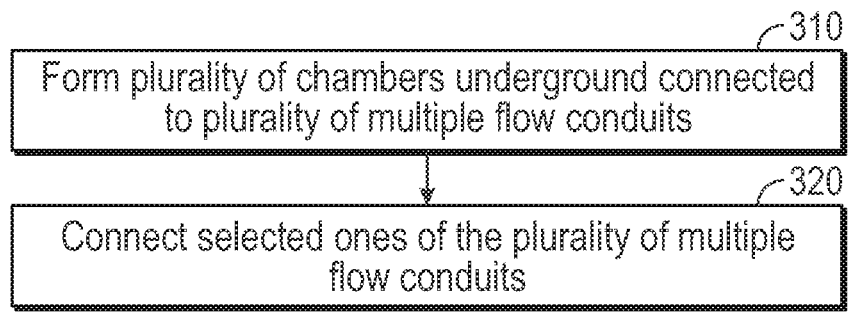
FIG. 3A shows a flow chart illustrating methods of constructing underground energy storage systems in an earth formation in accordance with embodiments of the present disclosure.

FIG. 3A shows a flow chart illustrating methods of constructing underground energy storage systems in an earth formation in accordance with embodiments of the present disclosure. Step 310 of method 300 comprises forming a plurality of chambers underground connected to a plurality of multiple flow conduits in a configuration as described in greater detail above. The plurality of chambers may include an upper chamber and a lower chamber each containing a working fluid. Each multiple flow conduit of the plurality of multiple flow conduits may comprise an inner tubular segment having a flowbore interior to the inner tubular segment configured to flow the working fluid, and an outer tubular segment containing the inner tubular segment, wherein each multiple flow conduit defines an annulus between the outer tubular segment and the inner tubular segment configured to flow a compressed gas. Step 320 of method 300 comprises connecting selected ones of the plurality of multiple flow conduits.

Figure 3B:
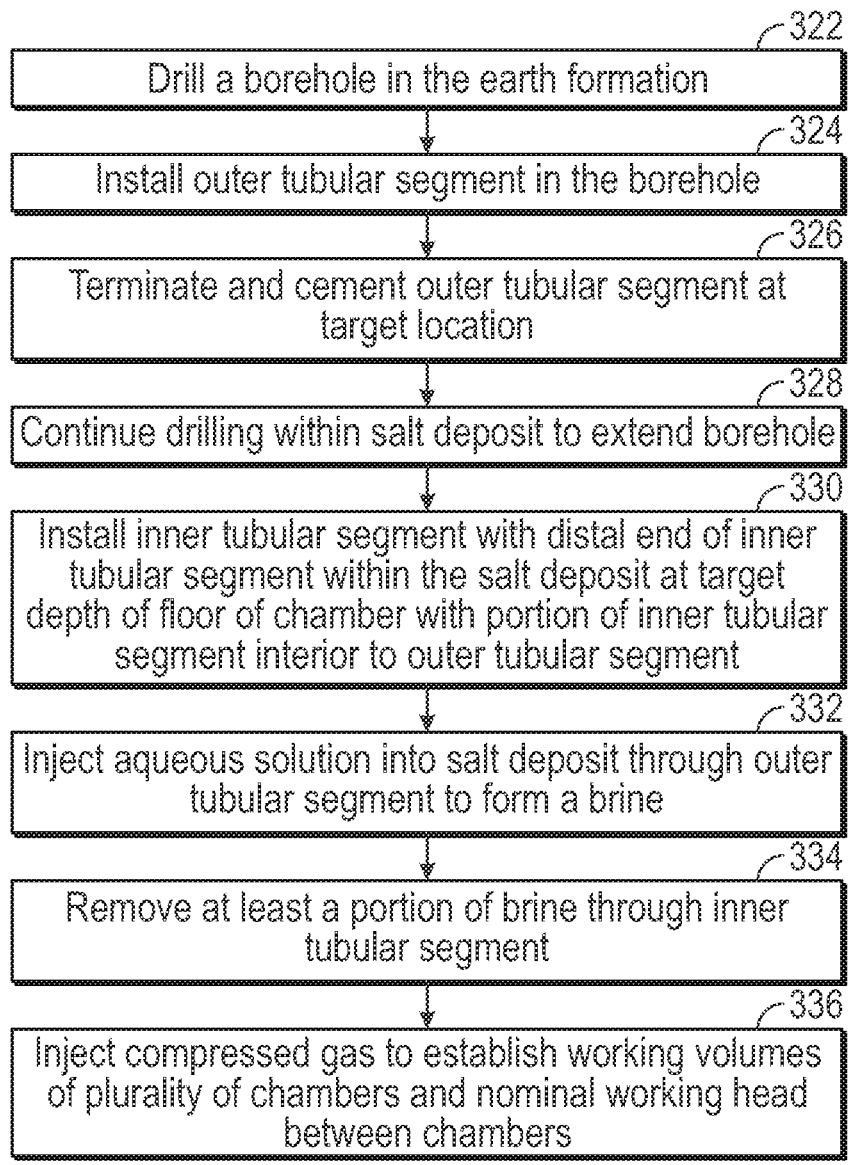
FIG. 3B shows a flow chart illustrating methods of forming a plurality of chambers underground connected to a plurality of multiple flow conduits in an earth formation in accordance with embodiments of the present disclosure.

FIG. 3B shows a flow chart illustrating methods of forming a plurality of chambers underground connected to a plurality of multiple flow conduits in an earth formation in accordance with embodiments of the present disclosure. Step 322 comprises drilling a borehole in the earth formation. Step 324 comprises installing an outer tubular segment in the borehole. This step may be accomplished using cased hole completion techniques or the like. The outer tubular segment may be oilfield pipe (e.g., a pipe joint). Alternatively, the outer tubular segment may comprise a casing string. The outer tubular may include several long sections of connected segments. For example, oilfield pipe may be coupled together into a casing string for hanging, and many casing strings may be installed together to form the outer tubular. Casing hangers may be installed in the wellhead to partially support the weight of the casing.

Step 326 comprises terminating and cementing the outer tubular segment at a distal end of the outer tubular segment at a target location within the salt deposit above an upper end of a desired location of the respective chamber of the plurality of chambers. A packer or the like may be used to seal the borehole. Cementing may be carried out by circulating a cement slurry through the inside of the casing and out into the annulus through a casing shoe at the bottom of the casing string. The casing string may include the casing shoe attached to a lowermost portion of the casing string for running in the borehole. The casing shoe may also help guide the casing string past obstructions as the casing string is lowered into the borehole. A plug may be pumped with a displacement fluid behind the cement column to constrain the casing shoe and prevent further flow of fluid through the shoe. Often, a float collar above the casing shoe may be employed to prevent fluid from flowing up through the shoe from the annulus.

Step 328 comprises continuing drilling within the salt deposit to extend the borehole. Step 328 may be carried out by sequential drilling. Step 330 comprises installing the inner tubular segment with a distal end of the inner tubular segment within the salt deposit at a target depth of a floor of the respective chamber and with a portion of the inner tubular segment interior to the outer tubular segment. This step may be accomplished using cased hole completion techniques or the like. Step 332 comprises injecting an aqueous solution into the salt deposit through the outer tubular segment to form a brine. Step 334 may include removing at least a portion of the brine through the inner tubular segment.

Step 336 may further include establishing a differential pressure between the upper chamber and the lower chamber by injection of a compressed gas to the upper portion of the upper chamber and the upper portion of the lower chamber via at least one outer tubular segment of the plurality. Step 336 may be carried out by injecting compressed gas to the outer annulus piping for the upper chamber and lower chamber while maintaining fluid communication between the upper chamber and lower chamber and commencing removal of a portion of the working fluid from both the upper chamber and the lower chamber via the plurality of inner tubular segments. Upon the compressed gas pressure in the outer annulus piping reaching a first target pressure corresponding to a first volume of working fluid in the upper chamber reaching a first operational volume, inner tubular segments for the upper chamber are closed to cease removal of working fluid from the upper chamber. Then, while maintaining injection of compressed gas, removal of the portion of the working fluid from the lower chamber is continued via respective ones of the plurality of inner tubular segments. Step 336 is then completed by, upon the compressed gas pressure in the outer annulus piping reaching a second target pressure corresponding to a second volume of working fluid in the lower chamber reaching a second operational volume, closing inner tubular segments for the lower chamber to cease removal of working fluid from the lower chamber while maintaining injection of compressed gas; and, upon the compressed gas pressure in the outer annulus piping reaching a third target pressure equating to the target surface pressures necessary to establish a nominal operating head, ceasing injection of compressed gas.

Any or all of steps 330-334 may be repeated several times as needed to shape and extend the chamber. Step 328 may be carried out prior to step 326 or 324. An earth boring casing shoe having at least one cutting structure mounted on an end of a section of casing may be used, for example. In some implementations, a wireline entry guide above the chamber may be used to facilitate any desired through-tubing operations. Steps 332 and 334 may be omitted in the case of a pre-existing cavern.

Figure 4A:
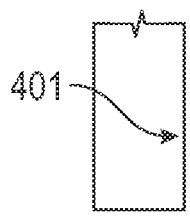
FIGS. 4A-4E shows a schematic diagram illustrating construction of the system utilizing methods described herein in accordance with embodiments of the present disclosure.
Figure 4B:
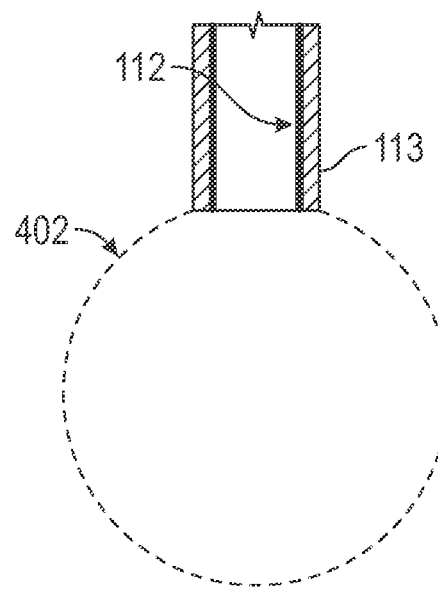
Figure 4C:
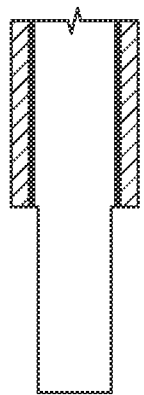
Figure 4D:
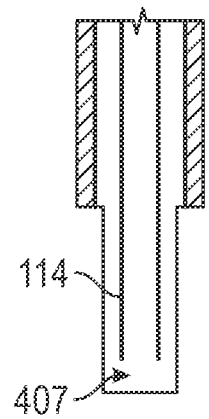
Figure 4E:
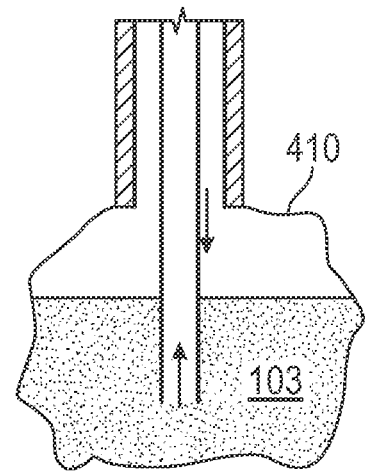

FIGS. 4A-4E shows a schematic diagram illustrating construction of the system utilizing methods described herein in accordance with embodiments of the present disclosure. FIG. 4A shows the formation following completion of a first phase, drilling a borehole in the earth formation. The borehole wall 401 defines a substantially cylindrical borehole in the formation with a diameter slightly larger than the outer tubular segments to be used. FIG. 4B shows outer tubular segment 112 installed in the borehole. Multiple tubular segments may be installed along the length of the borehole, extending from the surface to a desired location of the chamber. Outer tubular segment 112 is installed within the salt deposit above an upper end of a desired location 402 of the respective chamber, and then terminated and cemented at a distal end of the outer tubular segment, as shown in FIG. 4B. Cement 113 fills the original drilled annulus between the tubular segment 112 and the borehole wall 401 and holds the outer tubing in place. Continued drilling within the salt deposit results in an extended borehole configuration as shown in FIG. 4C. Referring to FIG. 4D, the inner tubular segment 114 has been installed with a distal end of the inner tubular segment 114 within the salt deposit at a target depth 407 of a floor of the respective chamber. A portion of the inner tubular segment lies interior to the outer tubular segment. FIG. 4E shows a cavern 410 within the earth formation resulting from injection of an aqueous solution into the salt deposit through the outer tubular segment to form a brine. In FIG. 4E, at least a portion of the brine has been removed through the inner tubular segment.

Figure 5:
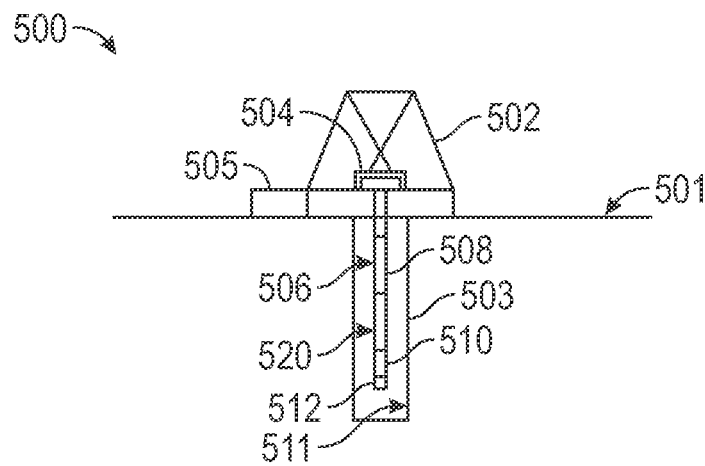
FIG. 5 shows a schematic diagram of an example drilling system having a drilling assembly conveyed in a borehole.

FIG. 5 shows a schematic diagram of an example drilling system having a drilling assembly conveyed in a borehole. The drilling system 500 may include a derrick 502 at the earths surface 501 which supports a rotary table 504. The rotary table may be rotated by an electric motor or the like. A drill string 506 extends downward from the derrick into the borehole 503. The drill string 506 may include multiple sections of drill pipe 508 with the drilling assembly 510 attached to one of the sections at the distal end of the string. The drilling assembly includes a drill bit 512. The string 506 may be rotated to cause the drill bit to disintegrate the earth formation at the distal end, thereby extending the borehole 503.

During drilling, drilling fluid may be circulated under pressure through the drill string by a pump 505. After discharging through openings in the drill bit 512, the fluid may circulate uphole through the annular space 520 between the drill string 506 and the wall 511 of the borehole 503. In some embodiments, the drilling assembly may include a downhole motor used to cause or facilitate rotation of the drill bit, and some drilling systems may utilize coiled tubing or the like to convey the drilling assembly. The rig may also be used to install and cement tubular in the borehole.

Figure 6:
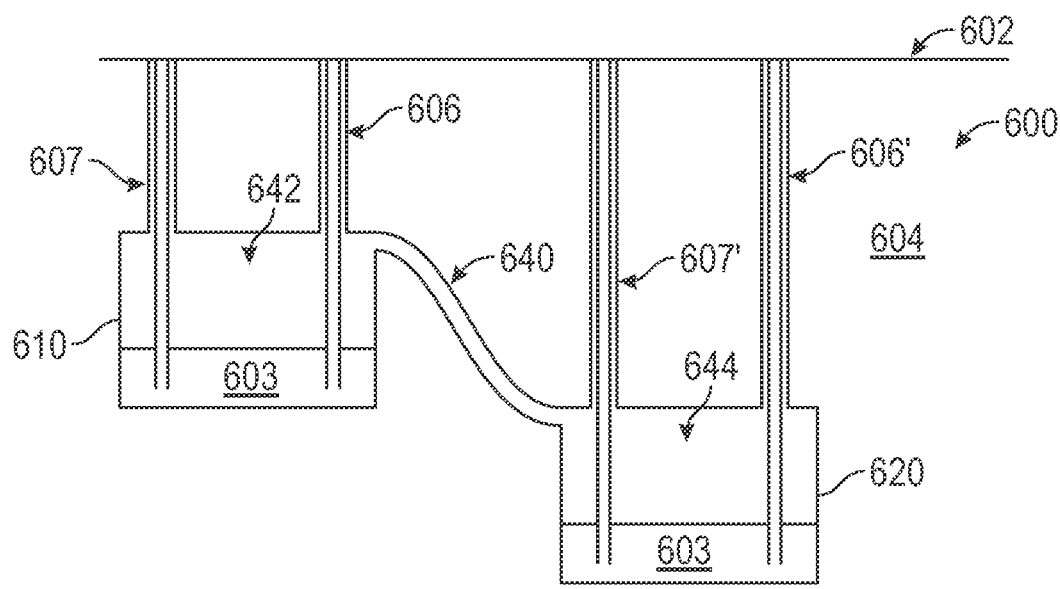
FIG. 6 shows a schematic diagram of another example energy storage system in accordance with embodiments of the present disclosure.

FIG. 6 shows a schematic diagram of another example energy storage system in accordance with embodiments of the present disclosure. The system 600 includes an upper chamber 610, a lower chamber 620, and a plurality of multiple flow conduits (606, 606', 607, 607'). The upper chamber 610 and the lower chamber 620 are located in a subterranean earth formation 604 below the surface of the earth 602. Multiple flow conduits (606, 606', 607, 607') are connected to each chamber. Each of the upper chamber and the lower chamber contain a working fluid 603, such as, for example, a brine. System 600 also includes a linkage shaft 640 which comprises a passage connecting the upper chamber and the lower chamber and thereby establishing fluid communication between an upper portion 642 of the upper chamber 610 and an upper portion 644 of the lower chamber 620. The linkage shaft may be formed by injecting aqueous solution into the salt deposit to form the passage (i.e., solution mined). The linkage shaft 640 allows compressed gas to better move between chambers when fluid is being moved. Gas moves in the opposite direction of the fluid; that is, during the energy storage phase when fluid is being moved from a lower chamber to an upper chamber, compressed gas in will move in the opposite direction from upper to lower.

Figure 7:
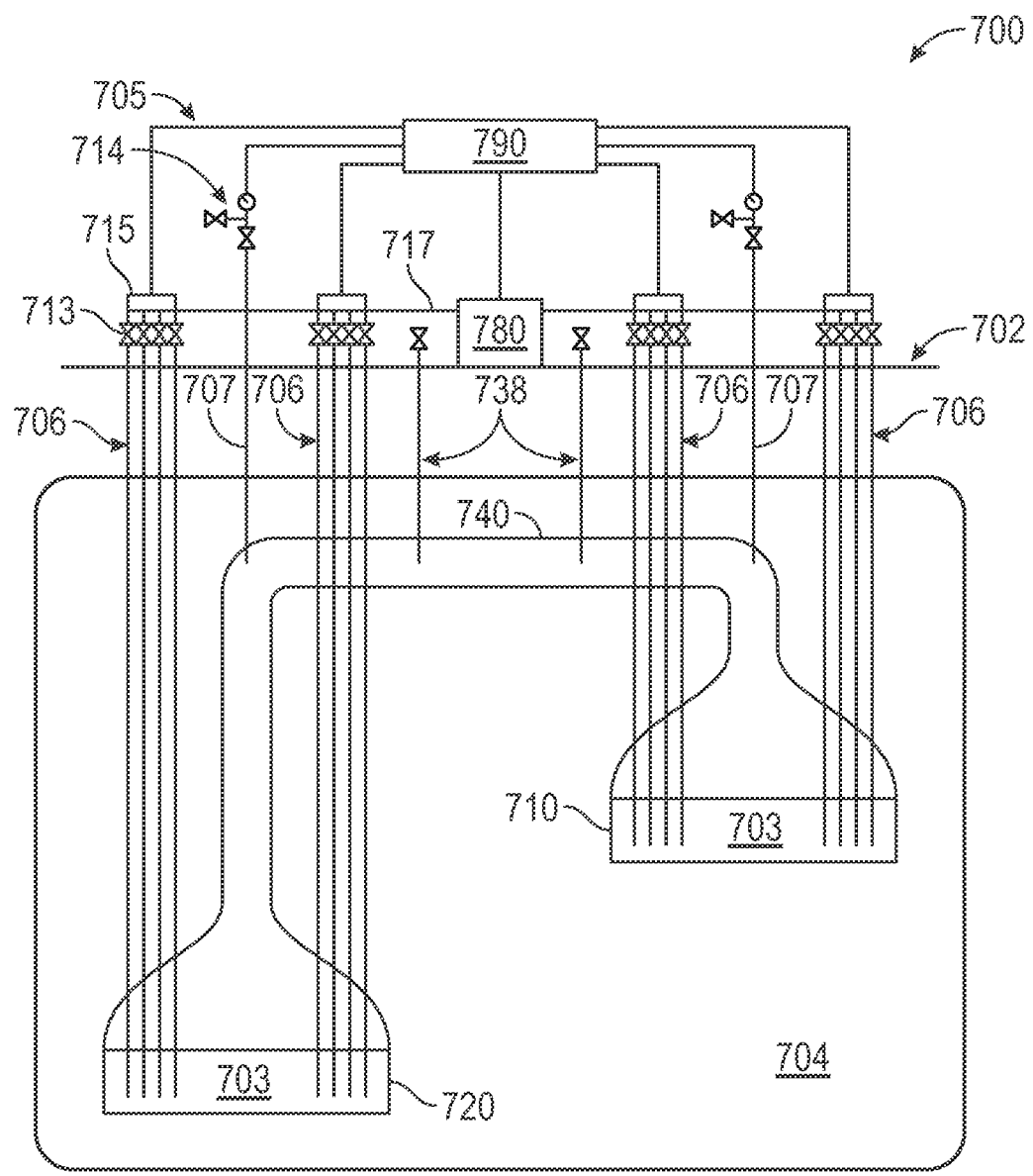
FIG. 7 shows an operational schematic diagram of another example energy storage system in accordance with embodiments of the present disclosure.

FIG. 7 shows an operational schematic diagram of another example energy storage system in accordance with embodiments of the present disclosure. The system 700 includes an upper chamber 710, a lower chamber 720, and a plurality of multiple flow conduits, represented here operationally as fluid flow conduits 706 and gas flow conduits 707. In other embodiments, some of fluid flow conduits 706 and/or gas flow conduits 707 may be implemented as non-multiple flow conduits. System 700 also includes a linkage shaft 740 formed by solution mining via auxiliary wells 738.

The upper chamber 710 and the lower chamber 720 are located in a salt deposit 704 (a salt dome) below the surface of the earth 702. Multiple flow conduits are connected to each chamber. Each of the upper chamber and the lower chamber contain a working fluid 703. Valve assemblies 713 connect fluid flow lines 706 to manifolds 715 which are coupled together to a main line 717. Pump/turbine 780 is located at the surface 702 and operates in main line 717. Valve assemblies 714 control the introduction or release of pressurized gas to gas flow conduits 707. Main controller 790 operates valve assemblies 713 and valve assemblies 714.

Certain embodiments of the present disclosure may be directed to a controller via wiring 705, such as main controller 790, which may be implemented with a hardware environment that includes an information processor, an information storage medium, an input device, processor memory, and may include a peripheral information storage medium. The hardware environment may be in the well, at the rig, or at a remote location. Moreover, the several components of the hardware environment may be distributed among those locations. The information storage medium may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. The information storage medium may store a program comprising computer program instructions that when executed causes the information processor to execute the methods disclosed herein. These instructions may provide for equipment operation, control, data collection and analysis and other functions in addition to the functions described in this disclosure. In addition to executing instructions stored in computer memory accessible to the processor, some processors implementing aspects of the present disclosure may employ logic implemented as field-programmable gate arrays ('FPGAs'), application-specific integrated circuits ('ASICs'), other combinatorial or sequential logic hardware, and so on.

Particular embodiments in accordance with the present disclosure may include a plurality of nested tubulars including one or more intermediate tubulars between the inner and outer tubular. These intermediate tubulars may serve one or more purposes for system function, such as providing redundant or failsafe passages, providing passages facilitating cabling for system power or communications, providing additional functionality, and so on, as will occur to those of skill in the art. For example, in some instances additional passages may facilitate separation of injected solutions or solvents for dissolving the salt deposit.

In embodiments of the present disclosure, each multiple flow conduit defines an annulus between the outer tubular segment and the inner tubular segment configured to flow a compressed gas. As used herein, "an annulus" means at least one annulus. In particular cases, the annulus between the outer tubular segment and the inner tubular segment may be further defined by i) one of the outer tubular segment or the inner tubular segment, and ii) an additional tubular; by a plurality of nested additional tubulars; combinations of these; and other configurations as will occur to those of skill in the art.

Figure 8A:
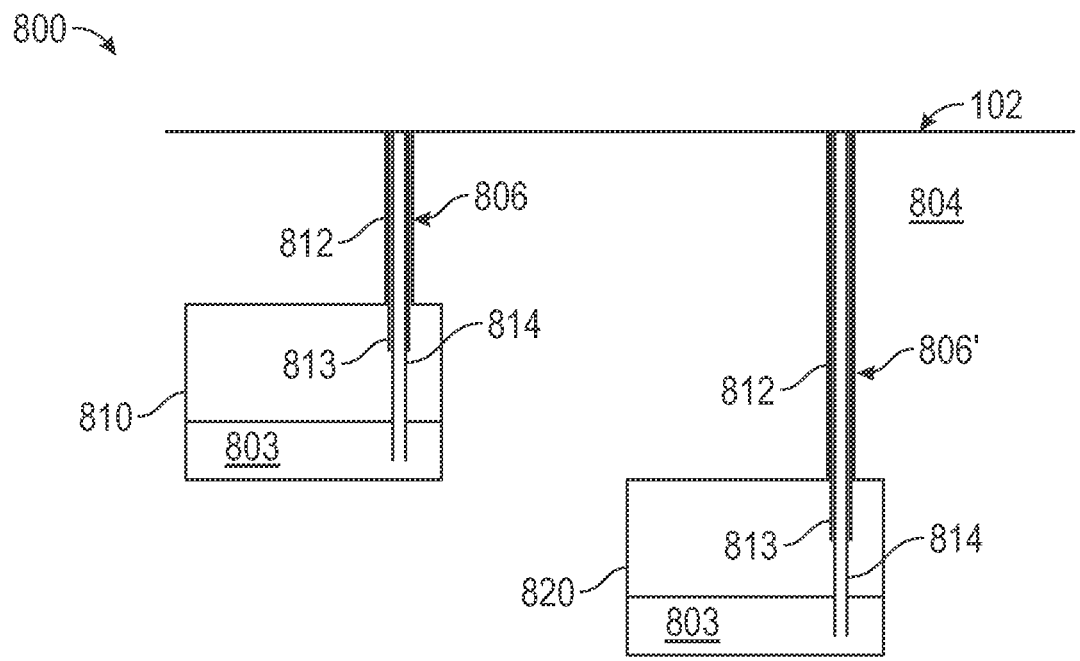
FIGS. 8A & 8B illustrate example systems in accordance with embodiments of the present disclosure having intermediate tubular segments.
Figure 8B:
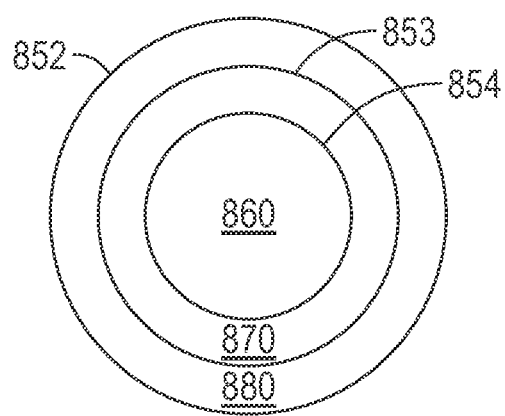

FIGS. 8A & 8B illustrate example systems in accordance with embodiments of the present disclosure having intermediate tubular segments. FIG. 8A shows a schematic diagram of an example energy storage system in accordance with embodiments of the present disclosure. The system 800 includes an upper chamber 810, a lower chamber 820, and a plurality of multiple flow conduits (806, 806'). The upper chamber 810 and the lower chamber 820 are located in a subterranean earth formation 804 below the surface of the earth 802. At least one multiple flow conduit (806, 806') is connected to each chamber. Each of the upper chamber and the lower chamber contain a working fluid 803, such as, for example, a brine and a compressed gas 808. Each multiple flow conduit 806, 806' comprises an inner tubular segment 814, a middle tubular segment 813 containing (e.g., encircling) the inner tubular segment 814, and an outer tubular segment 812 containing (e.g., encircling) the middle tubular segment 813.

FIG. 8B shows a cross-sectional view of another example multiple flow conduit in accordance with embodiments of the present disclosure. An inner tubular segment 854 has a flowbore 860 interior to the segment. The flowbore 860 is configured to flow the working fluid. The multiple flow conduit defines an annulus 870 between the middle tubular segment 853 and the inner tubular segment 854 configured to flow a compressed gas during operation but to remove brine during solution mining of the chamber. The multiple flow conduit defines an annulus 880 between the middle tubular segment 853 and the outer tubular segment 852 configured to flow a compressed gas. The longitudinal axis of the inner tubular segment 854 may be substantially coaxial with the longitudinal axis of the outer tubular segment 852 and middle tubular segment 853, wherein the respective longitudinal axis of each segment lies interior to the inner tubular segment. Thus, the cross sections at a particular junction may be concentric circles. Alternatively, the cross sections may be eccentric with respect to one another. The cross section of the inner tubular segment 854 may be circumscribed by the cross section of the outer tubular segment 852.

Figure 9:
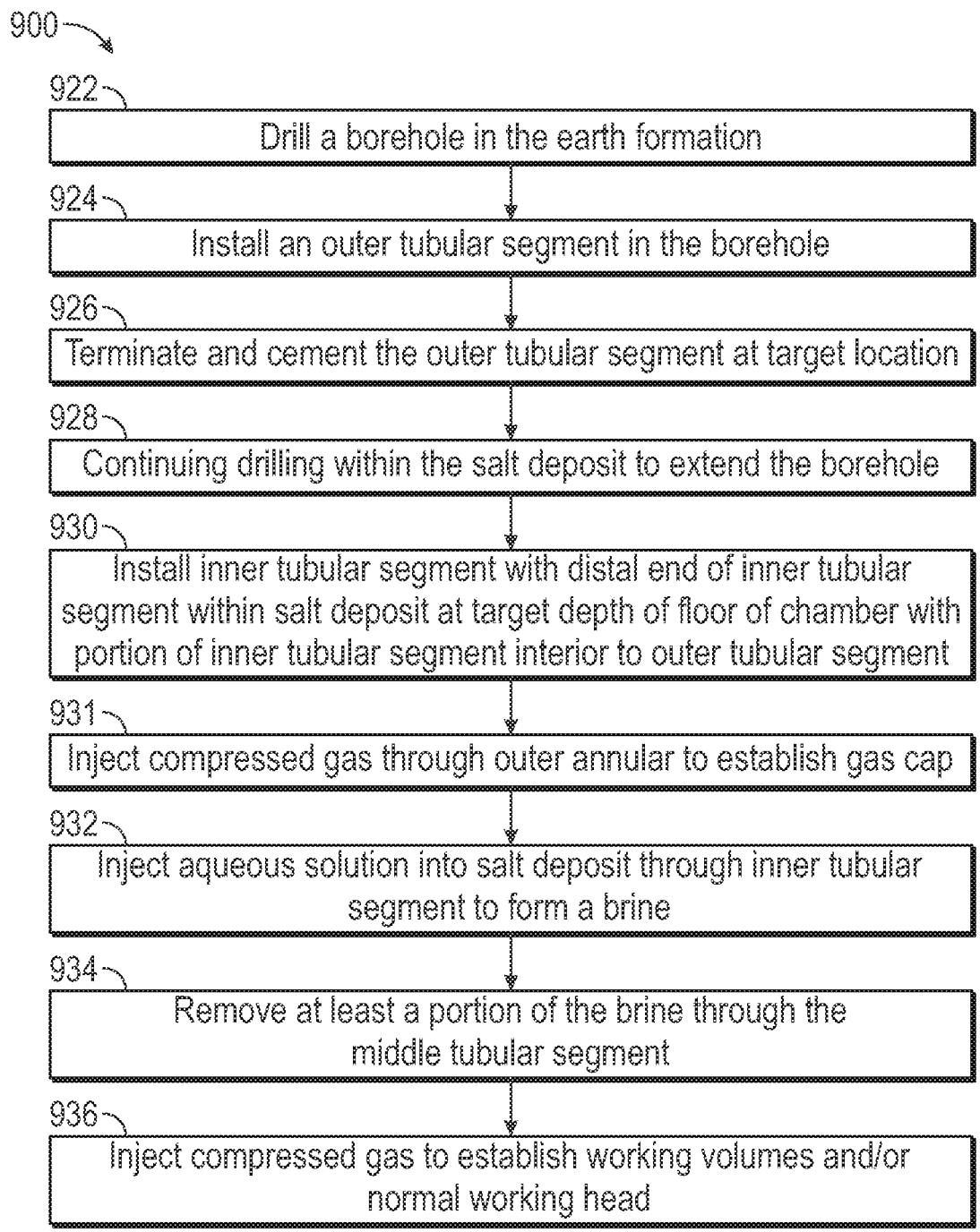
FIG. 9 shows a flow chart illustrating alternative methods of forming a plurality of chambers underground connected to a plurality of multiple flow conduits in an earth formation in accordance with embodiments of the present disclosure.

FIG. 9 shows a flow chart illustrating alternative methods of forming a plurality of chambers underground connected to a plurality of multiple flow conduits in an earth formation in accordance with embodiments of the present disclosure. Step 922 comprises drilling a borehole in the earth formation. Step 924 comprises installing an outer tubular segment in the borehole. This step may be accomplished using cased hole completion techniques or the like. The outer tubular segment may be oilfield pipe (e.g., a pipe joint). Alternatively, the outer tubular segment may comprise a casing string. The outer tubular may include several long sections of connected segments. For example, oilfield pipe may be coupled together into a casing string for hanging, and many casing strings may be installed together to form the outer tubular. Casing hangers may be installed in the wellhead to partially support the weight of the casing.

Step 926 comprises terminating and cementing the outer tubular segment at a distal end of the outer tubular segment at a target location within the salt deposit above an upper end of a desired location of the respective chamber of the plurality of chambers. A packer or the like may be used to seal the borehole. Cementing may be carried out by circulating a cement slurry through the inside of the casing and out into the annulus through a casing shoe at the bottom of the casing string. The casing string may include the casing shoe attached to a lowermost portion of the casing string for running in the borehole. The casing shoe may also help guide the casing string past obstructions as the casing string is lowered into the borehole. A plug may be pumped with a displacement fluid behind the cement column to constrain the casing shoe and prevent further flow of fluid through the shoe. Often, a float collar above the casing shoe may be employed to prevent fluid from flowing up through the shoe from the annulus.

Step 928 comprises continuing drilling within the salt deposit to extend the borehole. Step 928 may be carried out by sequential drilling. Step 930 comprises installing the inner tubular segment with a distal end of the inner tubular segment within the salt deposit at a target depth of a floor of the respective chamber and with a portion of the inner tubular segment interior to the outer tubular segment. This step may be accomplished using cased hole completion techniques or the like. Step 931 comprises injecting compressed gas through the outer annular to establish a gas cap in the well bore above where the solution mining is to occur and below the casing show of the outer tubular segment. Step 932 comprises injecting an aqueous solution into the salt deposit through the inner tubular segment to form a brine. Step 934 may include removing at least a portion of the brine through the middle tubular segment.

Step 936 may further include establishing a differential pressure between the upper chamber and the lower chamber by injection of a compressed gas to the upper portion of the upper chamber and the upper portion of the lower chamber via at least one outer tubular segment of the plurality. Step 936 may be carried out by injecting compressed gas to the outer annulus piping for the upper chamber and lower chamber while maintaining fluid communication between the upper chamber and lower chamber and commencing removal of a portion of the working fluid from both the upper chamber and the lower chamber via the plurality of inner tubular segments. Upon the compressed gas pressure in the outer annulus piping reaching a first target pressure corresponding to a first volume of working fluid in the upper chamber reaching a first operational volume, inner tubular segments for the upper chamber are closed to cease removal of working fluid from the upper chamber. Then, while maintaining injection of compressed gas, removal of the portion of the working fluid from the lower chamber is continued via respective ones of the plurality of inner tubular segments. Step 936 is then completed by, upon the compressed gas pressure in the outer annulus piping reaching a second target pressure corresponding to a second volume of working fluid in the lower chamber reaching a second operational volume, closing inner tubular segments for the lower chamber to cease removal of working fluid from the lower chamber while maintaining injection of compressed gas; and, upon the compressed gas pressure in the outer annulus piping reaching a third target pressure equating to the target surface pressures necessary to establish a nominal operating head, ceasing injection of compressed gas.

Any or all of steps 930-934 may be repeated several times as needed to shape and extend the chamber. Step 928 may be carried out prior to step 926 or 924. An earth boring casing shoe having at least one cutting structure mounted on an end of a section of casing may be used, for example. In some implementations, a wireline entry guide above the chamber may be used to facilitate any desired through-tubing operations. Steps 931, 932 and 934 may be omitted in the case of a pre-existing cavern.

Figure 10C:
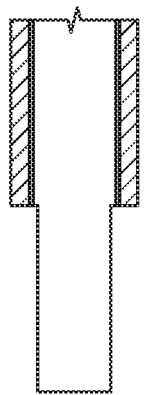
Figure 10D:
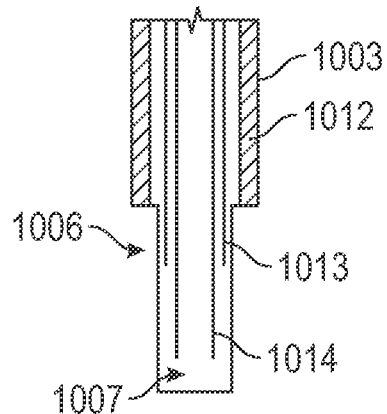

FIGS. 10A-10E show schematic diagrams illustrating construction of the system utilizing methods described herein in accordance with embodiments of the present disclosure. FIG. 10A shows the formation following completion of a first phase, drilling a borehole in the earth formation. The borehole wall 1001 defines a substantially cylindrical borehole in the formation with a diame7ter slightly larger than the outer tubular segments to be used. FIG. 10B shows outer tubular segment 1012 installed in the borehole. Multiple tubular segments may be installed along the length of the borehole, extending from the surface to a desired location of the chamber. Outer tubular segment 1012 is installed within the salt deposit above an upper end of a desired location 1002 of the respective chamber, and then terminated and cemented at a distal end of the outer tubular segment, as shown in FIG. 4B. Cement 1003 fills the original drilled annulus between the tubular segment 1012 and the borehole wall 1001 and holds the outer tubing in place. Continued drilling within the salt deposit results in an extended borehole configuration as shown in FIG. 10C. Referring to FIG. 10D, the middle tubular segment 1013 has been installed with a distal end of the middle tubular segment 1013 within the salt deposit at a target depth 1006 above a floor of the respective chamber. The inner tubular segment 1014 has been installed with a distal end of the inner tubular segment 1014 within the salt deposit at a target depth 1007 of the floor of the respective chamber. A portion of the inner tubular segment lies interior to the outer tubular segment.

As described above, a flowbore 1060 is configured to flow the working fluid. The multiple flow conduit defines a middle annulus 1070 between the middle tubular segment 1013 and the inner tubular segment 1014 configured to flow a compressed gas during operation but to remove brine 1093 during solution mining of the chamber. The multiple flow conduit defines an outer annulus 1080 between the middle tubular segment 1013 and the outer tubular segment 1012 configured to flow a compressed gas.

Figure 10E:
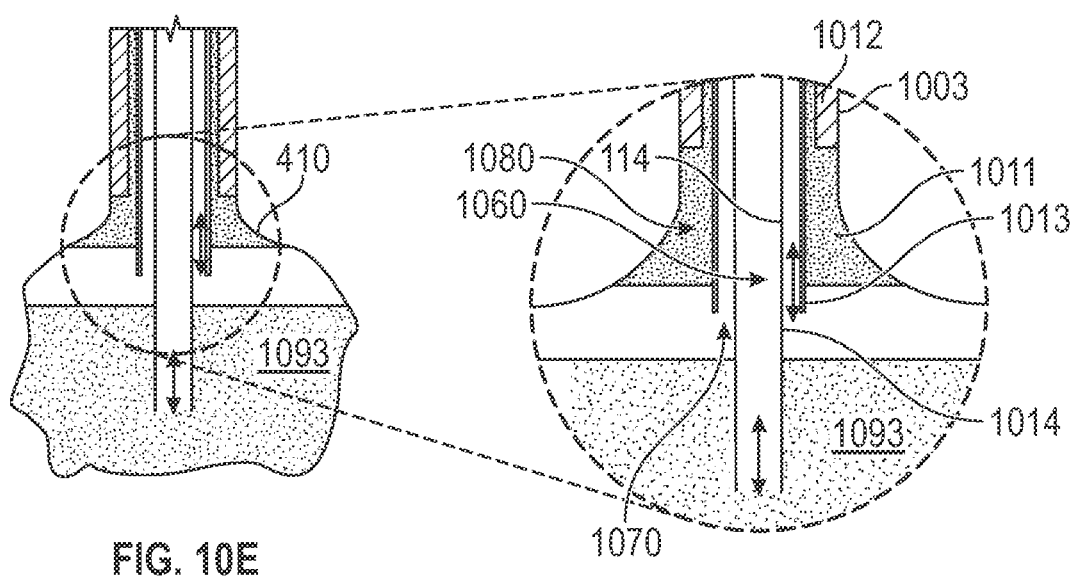

FIG. 10E shows a cavern 1010 within the earth formation resulting from injection of an aqueous solution into the salt deposit through the inner tubular segment to form a brine. In FIG. 10E, at least a portion of the brine has been removed through the middle tubular segment. A compressed gas 1011 has been injected down the outer annulus 1080 between the outer tubular and middle tubular until the compressed gas displaces the brine 1093 to a depth below the distal end 1015 of the outer tubular segment 1012 where the cement has been applied and above the distal end 1016 of the middle tubular segment 1013. The compressed gas may prevent any solution mining from occurring near the distal end 1015 of the outer tubular segment 1012.

As used herein, the term "fluid" and "fluids" refers to one or more gasses, one or more liquids, and mixtures thereof. A "working fluid" as used herein includes any liquid, along with any flowable solid or dissolved gas and other materials having a fluid property. The working fluid may be natural or man-made and may be transported downhole, recovered from a downhole location, or created downhole. Non-limiting examples of working fluids include water, brines, engineered fluids, oils, solvents, and combinations thereof. An "engineered fluid" may be used herein to mean a human made fluid formulated for a particular purpose.

Particular dimensions, well counts, and pressures for systems in accordance with the present disclosure may vary based on targeted amount of energy storage, terrain, shape of the underground salt dome (if existing caverns are being used), and so on.

While the foregoing disclosure is directed to the one mode embodiments of the disclosure, various modifications will be apparent to those skilled in the art. It is intended that all variations be embraced by the foregoing disclosure.

What is claimed is:

1. A method for constructing underground energy storage systems in an earth formation having a salt deposit, the method comprising:
    forming a plurality of chambers underground connected to a plurality of multiple flow conduits, the plurality of chambers including an upper chamber and a lower chamber each containing a working fluid, each multiple flow conduit of the plurality of multiple flow conduits comprising
        i) an inner tubular segment having a flowbore interior to the inner tubular segment configured to flow the working fluid, and
        ii) an outer tubular segment containing the inner tubular segment,
        wherein each multiple flow conduit defines an annulus between the outer tubular segment and the inner tubular segment configured to flow a compressed gas,
        the forming the plurality of chambers underground comprising forming each respective chamber by:
            drilling a borehole in the earth formation;
            installing an outer tubular segment of a respective multiple flow conduit in the borehole;
            terminating and cementing the outer tubular segment at a distal end of the outer tubular segment at a target location within the salt deposit above an upper end of a desired location of the respective chamber of the plurality of chambers;
            continuing drilling within the salt deposit to extend the borehole;
            installing an inner tubular segment of a respective multiple flow conduit with a distal end of the inner tubular segment within the salt deposit at a target depth of a floor of the respective chamber and with a portion of the inner tubular segment interior to the outer tubular segment;
            injecting an aqueous solution into the salt deposit via the respective multiple flow conduit to form a brine;
            removing at least a portion of the brine via the respective multiple flow conduit;
        connecting selected ones of the plurality of multiple flow conduits; and
        establishing a differential pressure between the upper chamber and the lower chamber by injection of the compressed gas to the upper portion of the upper chamber and the upper portion of the lower chamber via at least one outer tubular segment of the plurality of multiple flow conduits.

2. The method of claim 1 further comprising establishing fluid communication between the upper portion of the upper chamber and the upper portion of the lower chamber.

3. The method of claim 1 wherein establishing fluid communication between the upper portion of the upper chamber and the upper portion of the lower chamber comprises injecting aqueous solution into the salt deposit to form a passage connecting the upper chamber and the lower chamber.

4. The method of claim 1 wherein the plurality of multiple flow conduits is configured to constrain pressure loss from any chamber of the plurality of chambers for any cycle of storage and recovery to less than five percent of a nominal operating head for the system.

5. The method of claim 1 further comprising configuring an aggregate flow capacity to substantially eliminate pressure loss from any chamber of the plurality of chambers due to flow of the working fluid therein.

6. The method of claim 5 wherein configuring an aggregate flow capacity to substantially eliminate pressure loss from any chamber of the plurality of chambers due to flow of the working fluid therein comprises selecting at least one of: i) the number of the plurality of inner tubular segments; and ii) dimensions of at least a portion of the plurality of inner tubular segments.

7. The method of claim 1 wherein the working fluid comprises the brine.

8. The method of claim 1 wherein drilling the borehole comprises using a drill bit at a distal end of a drill string to disintegrate a portion of the earth formation at the drill bit.

9. The method of claim 1 wherein establishing the differential pressure between the upper chamber and the lower chamber comprises:
    injecting the compressed gas to the annulus for the upper chamber and the annulus for the lower chamber while maintaining fluid communication between the upper chamber and the lower chamber;
    commencing removal of a portion of the working fluid from both the upper chamber and the lower chamber;
    upon the compressed gas pressure in the annulus reaching a first target pressure, the first target pressure corresponding to a first volume of working fluid in the upper chamber reaching a first operational volume, ceasing flow of the working fluid from the upper chamber;

while maintaining injection of the compressed gas, continuing removal of the portion of the working fluid from the lower chamber;

upon the compressed gas pressure in the annulus reaching a second target pressure, the second target pressure corresponding to a second volume of the working fluid in the lower chamber reaching a second operational volume, ceasing flow of the working fluid from the lower chamber, while maintaining injection of the compressed gas;

upon the compressed gas pressure in the annulus reaching a third target pressure, the third target pressure being the compressed gas pressure within the plurality of chambers that equates to the target surface pressures necessary to establish a nominal operating head, ceasing injection of the compressed gas.

10. The method of claim 9 wherein removal of the portion of the working fluid is carried out via the flowbore of the respective inner tubular segment for at least one of the plurality of multiple flow conduits.

11. The method of claim 9 wherein removal of the portion of the working fluid is carried out via the annulus between the outer tubular segment and the inner tubular segment for at least one of the plurality of multiple flow conduits.

12. The method of claim 9 wherein removal of the portion of the working fluid is carried out via an other annulus between the outer tubular segment and the inner tubular segment for at least one of the plurality of multiple flow conduits.

13. A method for constructing underground energy storage systems in an earth formation utilizing existing caverns in a subterranean salt deposit, the method comprising:

connecting a plurality of caverns underground to a plurality of multiple flow conduits, the plurality of caverns including an upper cavern and a lower cavern each containing a working fluid, each multiple flow conduit of the plurality of multiple flow conduits comprising:
i) an inner tubular segment having a flowbore interior to the inner tubular segment configured to flow the working fluid, and
ii) an outer tubular segment containing the inner tubular segment, wherein each multiple flow conduit defines an annulus between the outer tubular segment and the inner tubular segment configured to flow a compressed gas, the connecting the plurality of caverns underground comprising connecting each respective cavern by:
drilling a borehole in the earth formation;
installing an outer tubular segment in the borehole;
terminating and cementing the outer tubular segment at a distal end of the outer tubular segment at a target location within the salt deposit above an upper end of the cavern;
continuing drilling into the cavern;
installing the inner tubular segment with a distal end of the inner tubular segment within the salt deposit at a target depth for a floor of the respective cavern and with a portion of the inner tubular segment interior to the outer tubular segment;
injecting an aqueous solution into the salt deposit through the inner tubular segment to form a brine;
removing at least a portion of the brine;

connecting selected ones of the plurality of multiple flow conduits;

wherein establishing fluid communication between the upper portion of the upper chamber and the upper portion of the lower chamber comprises injecting aqueous solution into the salt deposit to form a passage connecting the upper chamber and the lower chamber.

14. The method of claim 13 further comprising establishing fluid communication between an upper portion of the upper chamber and the upper portion of the lower chamber.

15. The method of claim 13 wherein the plurality of multiple flow conduits is configured to constrain pressure loss from any chamber of the plurality of chambers for any cycle of storage and recovery to less than five percent of a nominal operating head for the system.

16. The method of claim 13 further comprising establishing a differential pressure between the upper chamber and the lower chamber by injection of a compressed gas to the upper portion of the upper chamber and the upper portion of the lower chamber via at least one outer tubular segment of the plurality of multiple flow conduits.

\* \* \* \* \*